(12) United States Patent
Valente

(10) Patent No.: US 6,309,321 B1
(45) Date of Patent: Oct. 30, 2001

(54) FULLY-LOCKING TORQUE-PROPORTIONING DIFFERENTIAL

(75) Inventor: Paul J. Valente, Berkley, MI (US)

(73) Assignee: Tractech INC, Warren, MI (US)

( * ) Notice: Subject to any disclaimer, the term of this patent is extended or adjusted under 35 U.S.C. 154(b) by 0 days.

(21) Appl. No.: 09/635,467

(22) Filed: Aug. 11, 2000

(51) Int. Cl.[7] .................................................. F16H 48/06
(52) U.S. Cl. ............................................................ 475/249
(58) Field of Search .................................... 475/150, 249, 475/250

(56) References Cited

U.S. PATENT DOCUMENTS

| | | |
|---|---|---|
| 3,706,239 | 12/1972 | Myers . |
| 4,341,294 | 7/1982 | Kerr . |
| 4,365,524 | 12/1982 | Dissett et al. . |
| 4,625,585 | 12/1986 | Dissett . |
| 4,677,876 | 7/1987 | Dissett . |
| 4,751,853 | 6/1988 | Dissett . |
| 5,638,931 | 6/1997 | Kerr . |

FOREIGN PATENT DOCUMENTS

99/28645   11/1997   (WO) .

Primary Examiner—Dirk Wright
(74) Attorney, Agent, or Firm—Laubscher & Laubscher

(57) ABSTRACT

A fully-locking torque-responsive differential includes an annular coupling device arranged concentrically between an axially-extending hub portion on one side gear and the wall surface of the carrier bore in which the side gear is rotatably mounted. An axially-displaceable trigger pin is operable externally of the differential housing in which the carrier is rotatably mounted between first and second positions in which the coupling device is unlocked and locked, respectively. The trigger pin may be operated either automatically or manually by the vehicle operator, use being made of an electrical, hydraulic, pneumatic or cable-operated linear shifting member that extends through a sealed opening contained in the differential housing.

18 Claims, 8 Drawing Sheets

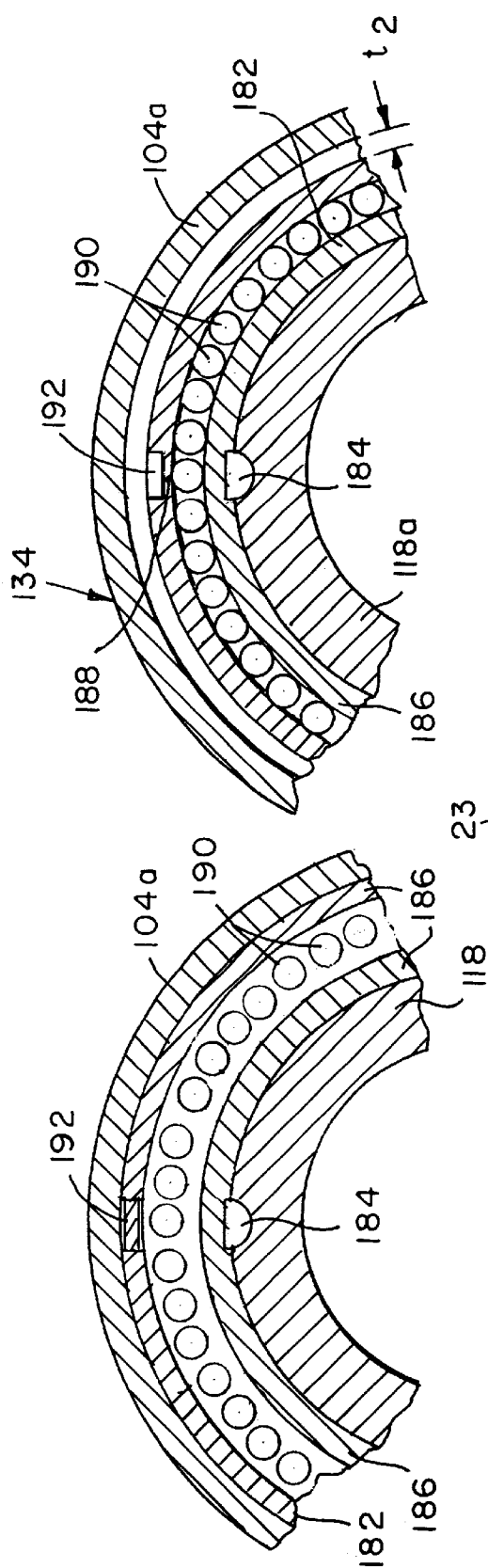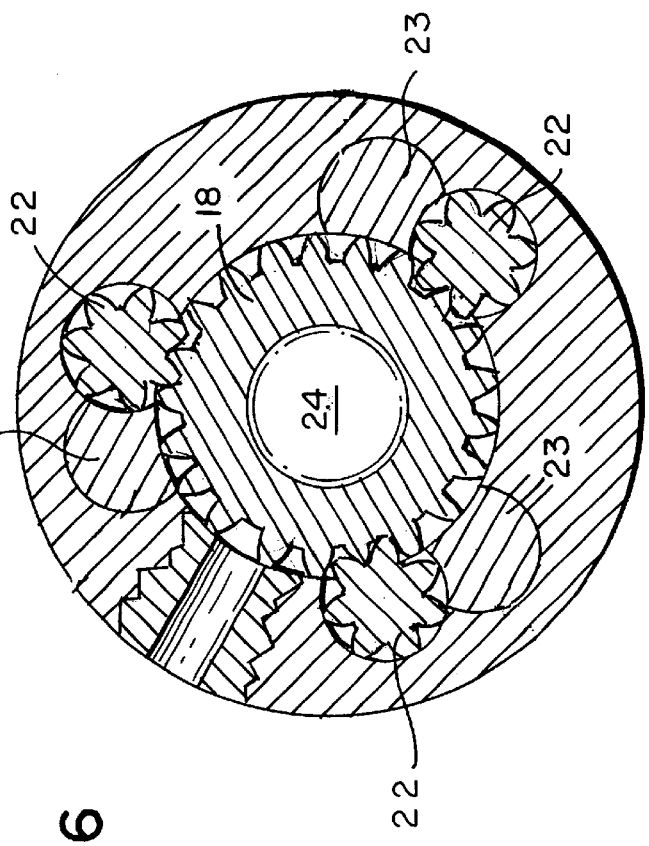

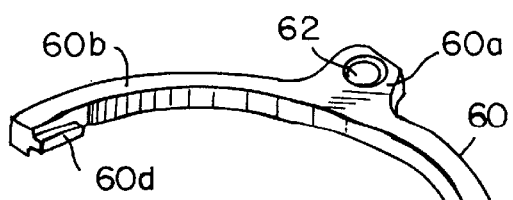
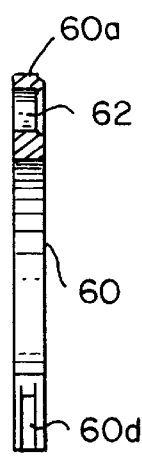
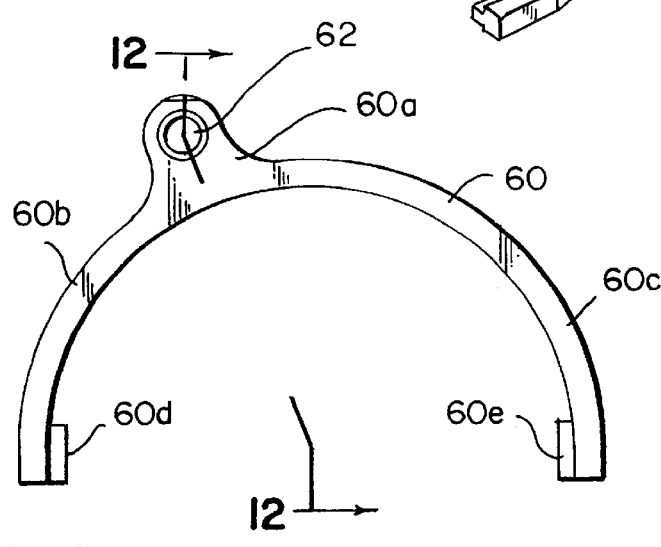
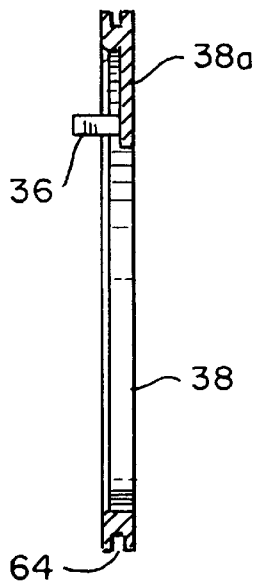
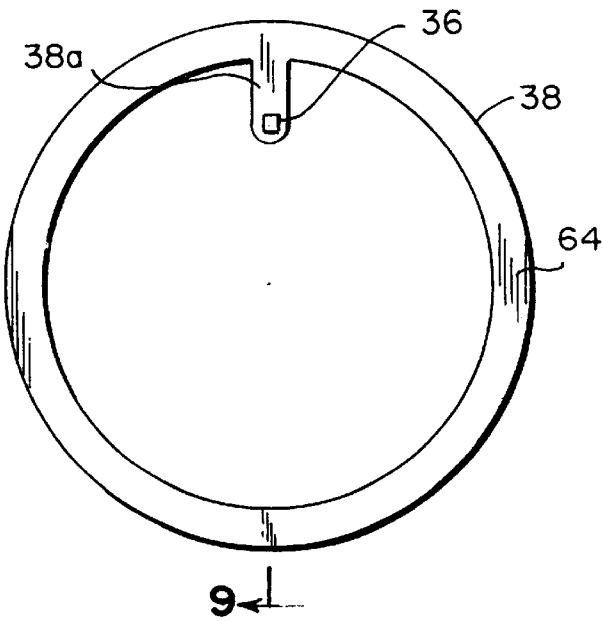

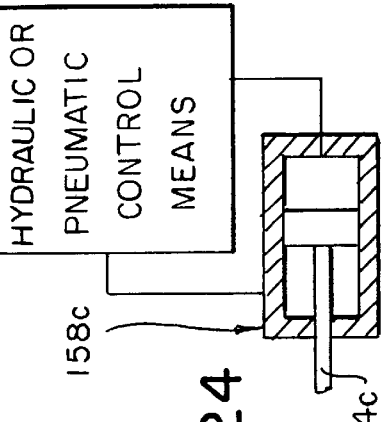
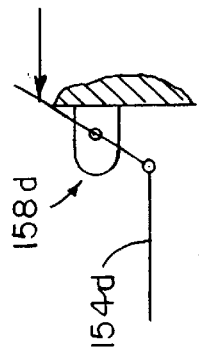
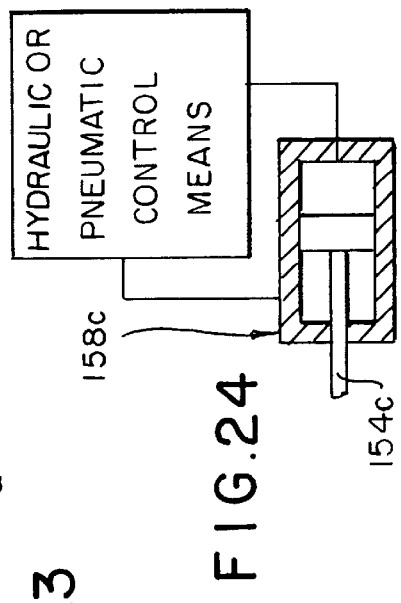
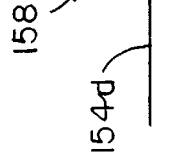
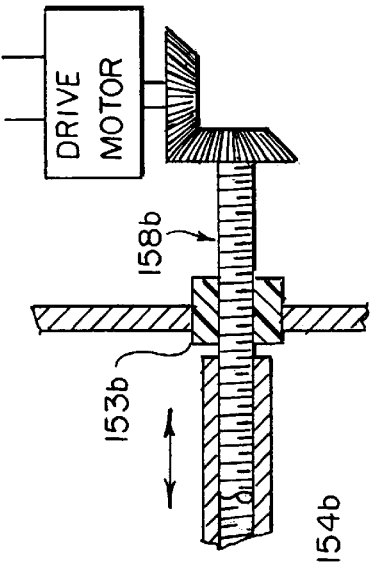
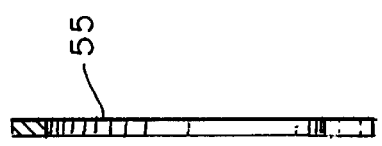
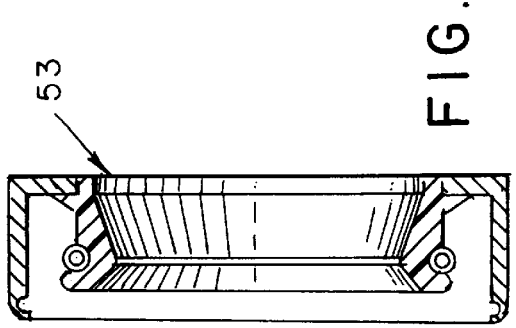
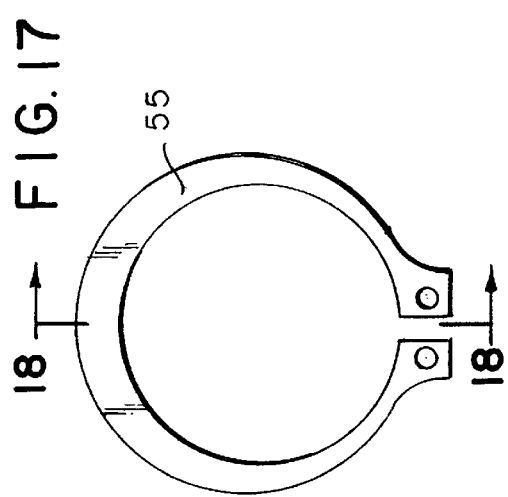

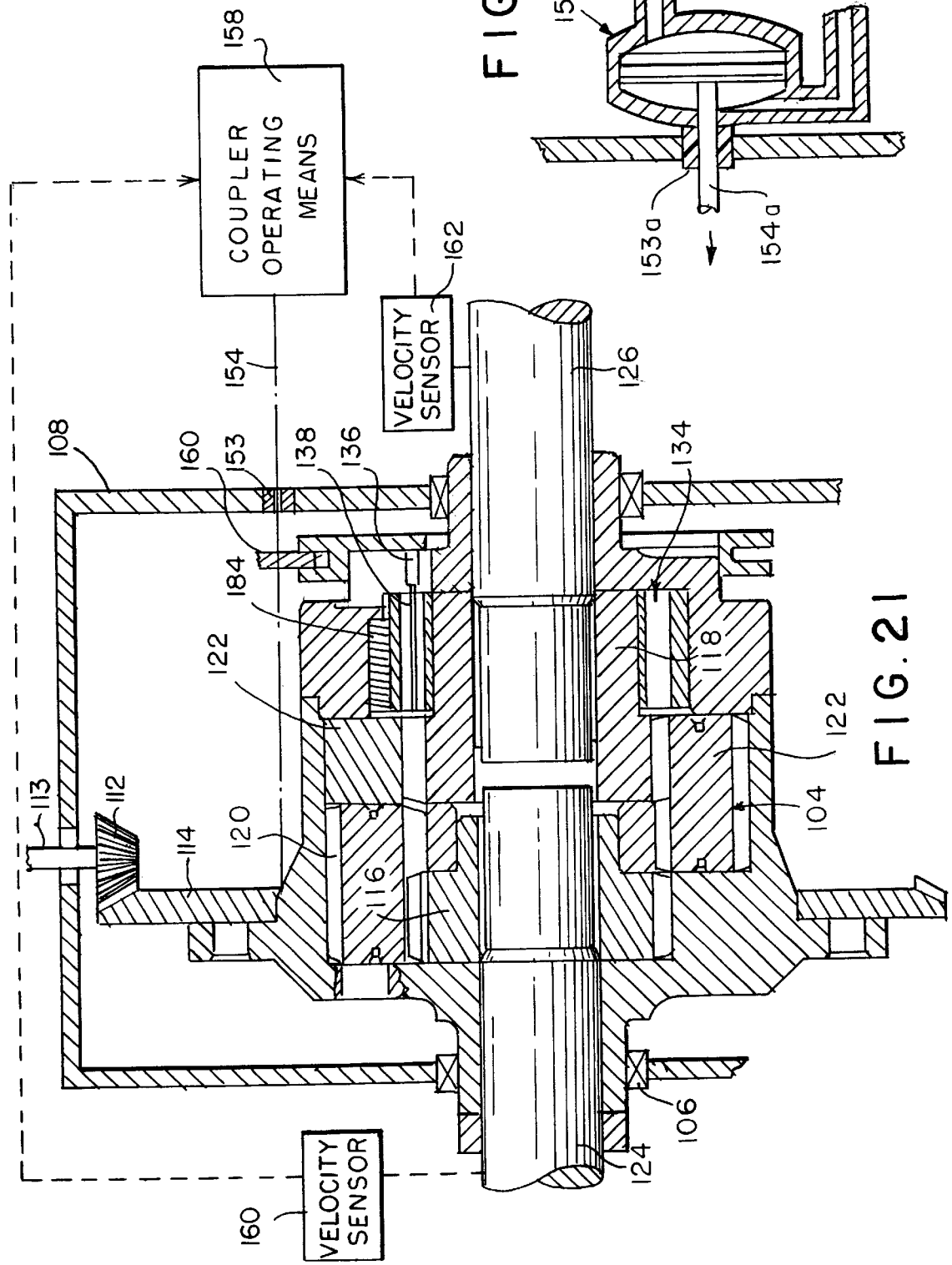
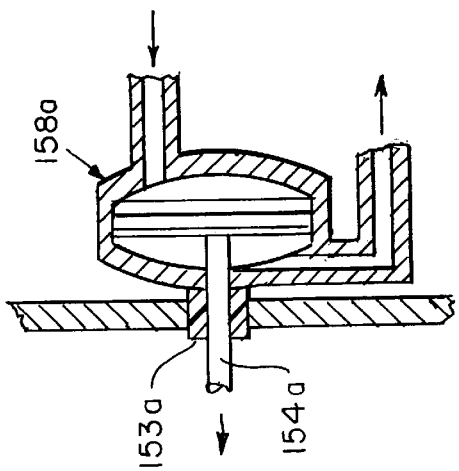

_US 6,309,321 B1_

FULLY-LOCKING TORQUE-PROPORTIONING DIFFERENTIAL

FIELD OF THE INVENTION

This invention relates to a torque-proportioning differential of the helical pinion type that includes locking means that are operable either automatically or by the operator of the vehicle.

BACKGROUND OF THE INVENTION

Torque-proportioning differential of the helical gear type are well known in the prior art, as evidenced by the prior patents to Myers U.S. Pat. No. 3,706,239, Dissett U.S. Pat. Nos. 4,625,585, 4,365,524, 4,625,585, 4,677,876, and 4,751,853, among others. Through the use of this type of differential over the years, it has become apparent that the need exists for locking means that are operable either automatically or by the vehicle operator to fully lock the driven axle shafts to each other, for example, upon the occurrence of a spin-out condition of one of the driving wheels. This can be achieved by locking one side gear to the case, or by locking one axle to the case (as is generally done with manual locking systems).

It is also known in the shaft coupling art to provide spiral type one-way clutches including raceway and roller means are arranged in the annular space between a pair of concentrically spaced annular coupling members. Examples of such coupling clutch means are presented by the Kerr U.S. Pat. Nos. 4,341,294 and 5,638,931.

The present invention was developed to provide an improved fully-locking torque-responsive differential that is operated between fully locked and unlocked conditions, respectively, either automatically or by an operator.

SUMMARY OF THE INVENTION

Accordingly, it is a primary object of the present invention to provide a fully-locking torque-responsive differential including automatic or manually operable coupling means for locking and unlocking a given side gear to the rotary casing of the differential.

According to a more specific object of the invention, annular coupling means are arranged concentrically between a tubular axially-extending hub portion of a given first side gear and the cylindrical wall portion of the bore of the carrier in which the one side gear is rotatably mounted. Non-rotatable operating means mounted on the differential housing within which the carrier rotates serve to operate the coupling means between locked engaged and unlocked disengaged conditions, respectively. The operating means includes an operating trigger pin that is axially displaceable between first and second positions relative to the carrier to disengage and engage the coupling means, respectively. Spring means bias the trigger pin toward the first position, whereby the coupling means are normally in the disengaged condition.

According to the preferred embodiment of the invention, the coupling means includes a radially-slit inner annular member that is normally biased radially inwardly toward an engaged condition in frictional engagement with the outer periphery of the hub portion of the one side gear. In this case, the trigger pin is normally biased axially in a direction to effect insertion of the end of the trigger pin into a keyed opening contained between the adjacent surfaces of the inner and outer coupling members, thereby to prevent relative angular displacement of the coupling members. The coupling rollers are in a loose condition, whereupon the inner coupling member rotates freely upon the associated side gear. When the trigger pin is axially displaced in the opposite direction to withdraw the pin from the keyed opening, the coupling members are relatively slightly angularly displaced to cause the rollers to ride up their associated coupling ramps, whereupon the split inner coupling member is compressed radially inwardly into locking engagement with the associated side gear, thereby to lock the side gear with the housing. According to a second embodiment of the invention, the outer coupling member is split and is resiliently biased radially outwardly toward frictional engagement with the wall of the bore formed in the housing. As before, the trigger pin is biased axially into the key hole between the coupling members, thereby to prevent relative angular displacement of the coupling members from the unlocked position to the locked position.

BRIEF DESCRIPTION OF THE DRAWING

Other objects and advantages of the invention will become apparent from a study of the following specification, when viewed in the light of the accompanying drawings, in which:

FIG. 2 is a sectional view taken along line 2—2 of FIG. 1;

FIG. 8 is a front elevation view of the trigger ring of FIG. 1, and

FIG. 9 is a sectional view taken along line 9—9 of FIG. 8;

FIGS. 10 and 11 are front elevation and perspective views, respectively, of the trigger ring operating fork, and FIG. 12 is a sectional view taken along line 12—12 of FIG. 10;

FIG. 17 is a plan view of the retaining clip of FIG. 1, and FIG. 18 is a sectional view taken along line 18—18 of FIG. 17;

FIG. 19 is a sectional view of the shaft seal means of FIG. 1;

FIG. 20 is a perspective view of the position sensing switch of FIG. 1;

FIG. 21 is a longitudinal sectional view of a second embodiment of the fully-locking torque-proportioning differential of the present invention;

FIGS. 22–25 are schematic illustrations of the pneumatic, electric, hydraulic, and cable means, respectively, for operating the coupler means of FIGS. 1 and 21; and FIGS. 26 and 27 illustrate schematically a second embodiment of the coupling means of FIGS. 6 and 7 with the coupling means in the engaged and disengaged conditions, respectively.

DETAILED DESCRIPTION

Figure 1:
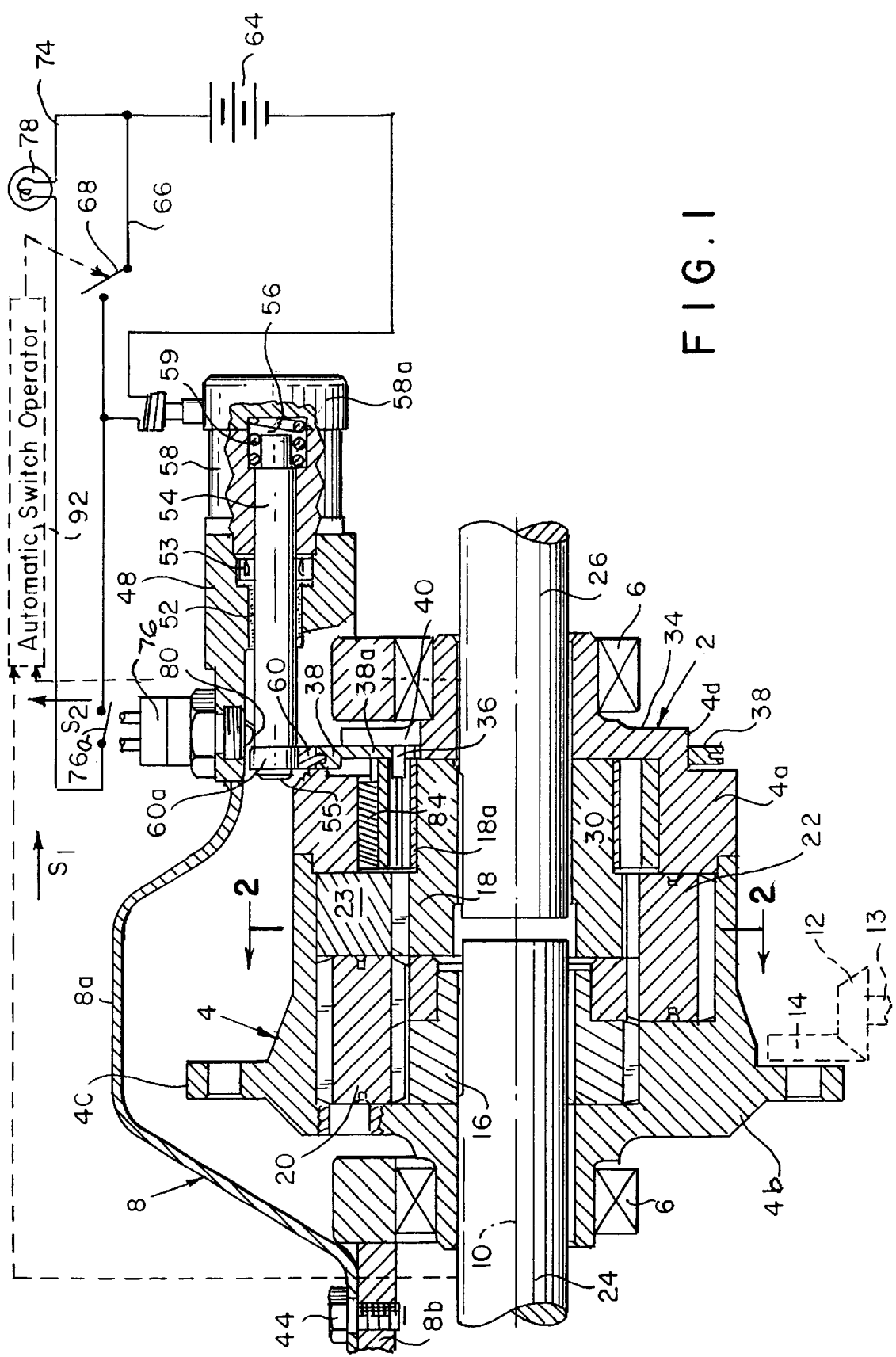
FIG. 1 is a longitudinal sectional view of a solenoid-operated first embodiment of the fully torque-portioning locking differential of the present invention taken along line 1—1 of FIG. 3.

Referring first more particularly to FIGS. 1–5, the fully-locking torque-responsive differential 2 of the present invention includes a generally cylindrical carrier 4 that is rotatably supported by bearings 6 within the differential housing 8 for rotation about the axis of rotation 10. As is known in the art, the carrier 4 is sectional and includes a cover section 4a that is bolted or welded to the carrier body 4b. The carrier is rotatably driven by drive pinion 12 and ring gear 14 that is bolted to the flange portion 4c of the carrier body. Rotatably supported in opposite ends of the carrier 4 are a pair of aligned annular side gears 16 and 18. As is known in the art, the side gears 16 and 18 have helical teeth that enmash with corresponding helical teeth on helical gears 20 and 22, respectively. The helical gears 20 and 22 are longitudinally displaced and are in enmeshing engagement at their adjacent ends, the remote ends of the helical gears being connected with the associated side gears 16 and 18. The ends of the bores containing the helical gears 20 are filled by dummy members 23, respectively. The side gears are internally splined to the collinearly aligned output shafts or axles 24 and 26, respectively.

Figure 5:
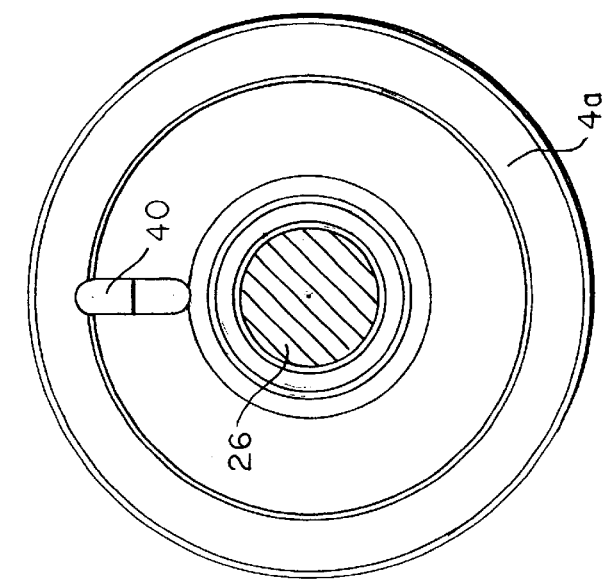
FIG. 5 is a right-hand end view of the casing end section of FIG. 1.

In accordance with the characterizing feature of the present invention, the side gear 18 includes an axially extending hub portion 18a that extends in the opposite direction away from the side gear 16, and the carrier end section 4a contains an oversized bore 30 that defines an annular space between the hub portion 18a and the wall surface of the bore 30. Mounted within this annular space are annular coupling means 34 which will be described in greater detail below in connection with FIGS. 6 and 7. The coupling means 34 are operable between engaged and disengaged conditions relative to the hub portion 18a of side gear 18 by operating means including a trigger pin 36. The trigger pin 36 is carried by a radially inwardly directed arm portion 38a of an annular trigger member 38 that is mounted for axial displacement on a stepped portion 4d of the cover section 4a. The radially inwardly directed arm portion 38a extends within a radial slot 40 contained in the cover section 4a as best shown in FIG. 5.

Figure 4:
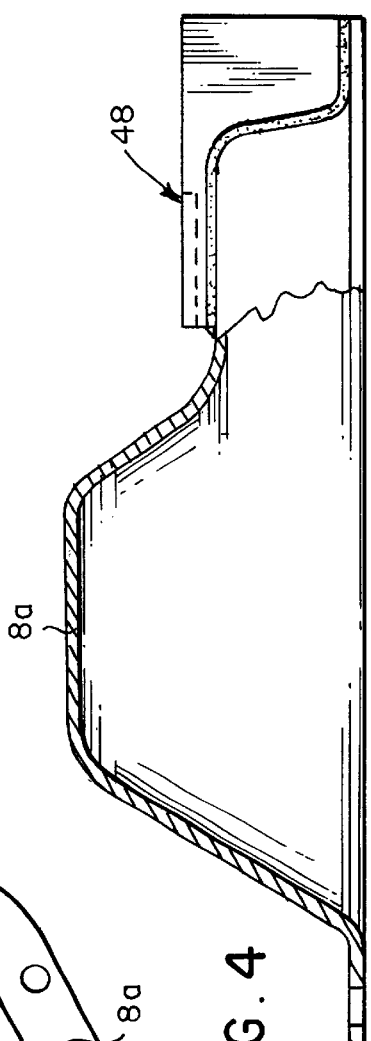
FIGS. 3 and 4 are top plan and longitudinal sectional views, respectively, of the housing cover member of FIG. 1.
Figure 3:
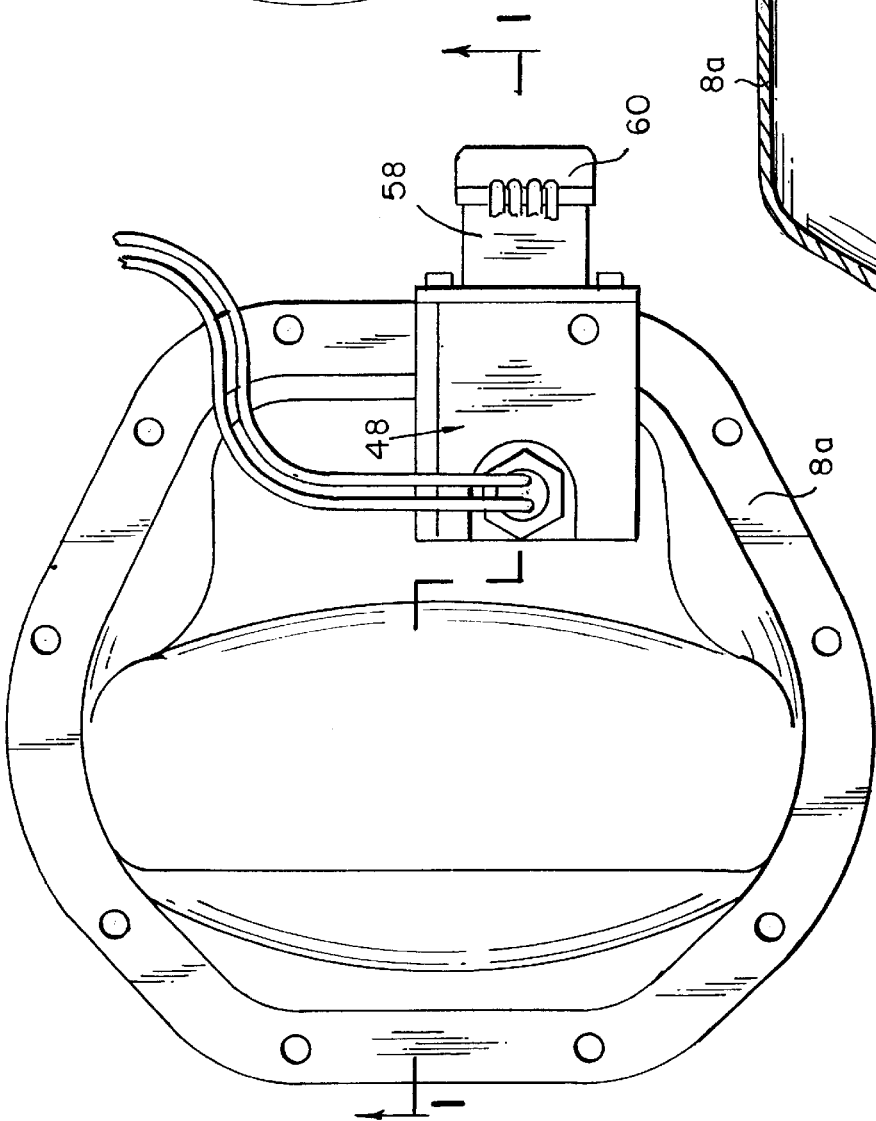

Referring to FIGS. 1, 3, and 4, the differential housing 8 includes a cover section 8a that is bolted to the main housing body 8b by bolt means 44. Welded to the housing cover 8a is an operating block 48 having a bushing 52 and annular seal means 53 (FIG. 19) that slidably receive the operating shaft 54. At its right-hand end, the shaft 54 includes a reduced end portion 54a that extends within chamber 56 defined by a counter bore formed in one end of cylindrical solenoid means 58, and a recess formed in the solenoid cover member 58a. A helical compression spring 59 is arranged in the chamber 56 concentrically about the reduced shaft portion 54a, and biases shaft 52 to the left in FIG. 1.

Mounted on the reduced end portion 54b at the other end of the operating shaft 54 by the annular resilient slit retaining clip 55 (FIGS. 17 and 18) is a fork member 60, as shown in FIGS. 10–12. The fork member 60 has a first portion 60a containing throughbore 62 that receives the reduced end portion 54b of control shaft 54. The fork member includes a pair of spaced leg portions 60b and 60c, the end portions of which are provided with inwardly directed projecting portions 60d and 60e that extend radially inwardly within circular groove 64 contained in the outer circumference of the trigger ring 38, as shown in FIG. 8. The retaining clip 55 is mounted in groove 57 formed in the reduced portion 54b of operating shaft 54.

Referring again to FIG. 1, the solenoid 58 includes a conventional helical solenoid coil 58a that is electrically connected with the opposite poles of a 12 volt battery 64 via a series circuit including conductor 66 containing on/off switch 68, and by a second conductor 70. Connected in parallel with the on/off switch 68 is a branch circuit conductor 74 that contains the normally open switch contact 76a of position-sensing switch 76, and an illuminating lamp 78. The position-sensing switch 76 is mounted within a corresponding throughbore 78 contained in the left-hand projecting portion 48a of the operating block 48. Thus, the movable switch operator 80 is positioned for engagement by the central portion 60a of the operating fork 60 when the solenoid 58 is energized, as will be described in greater detail below. Position switch 80 is of the type produced by Control Products, Inc., of East Hanover, N.J., or Ketek International of Valletta, Malta.

Figure 6:
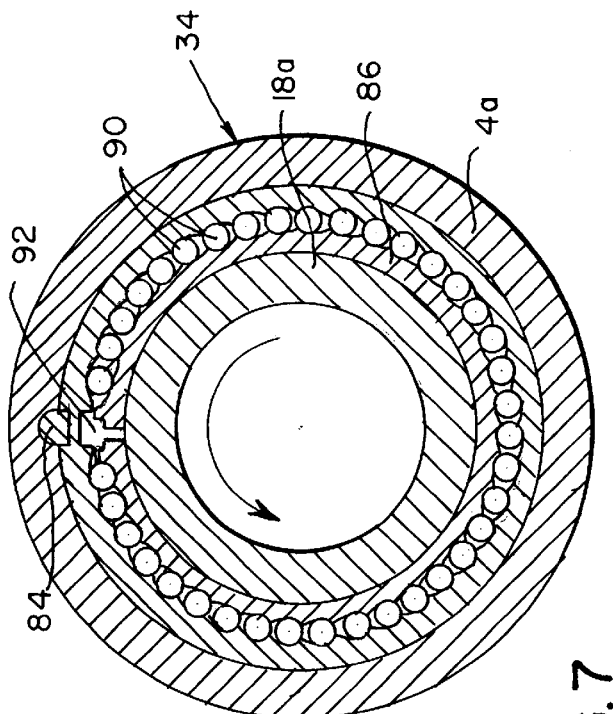
FIGS. 6 and 6A are sectional and detailed views, respectively, of the coupler means of FIG. 1 when in the disengaged condition.
Figure 6A:
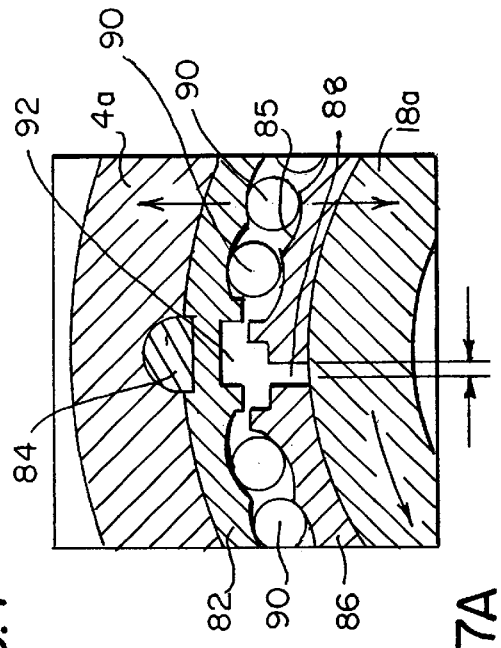
Figure 7:
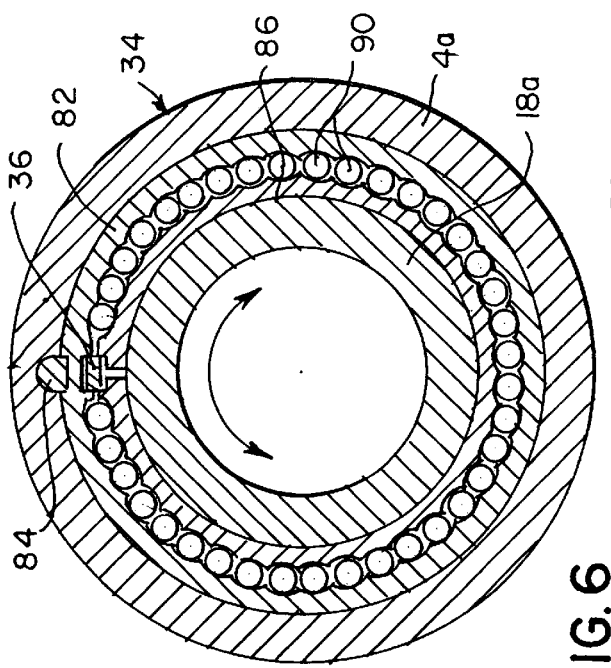
FIGS. 7 and 7A are sectional and detailed views, respectively, of the coupler means of FIG. 1 when in the engaged condition.
Figure 7A:
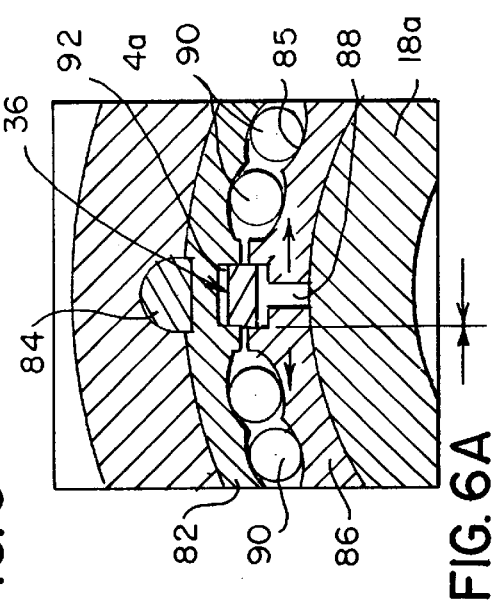
Figure 14:
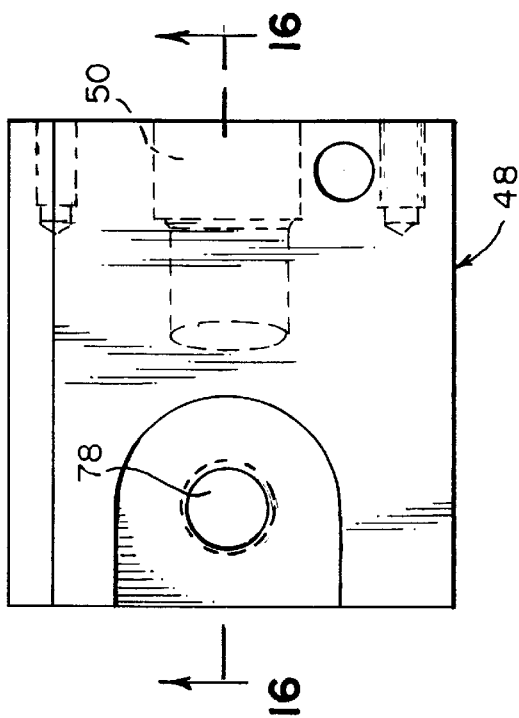
FIGS. 14 and 15 are top plan and left-hand elevation views, respectively, of the cover block member of FIG. 1.
Figure 16:
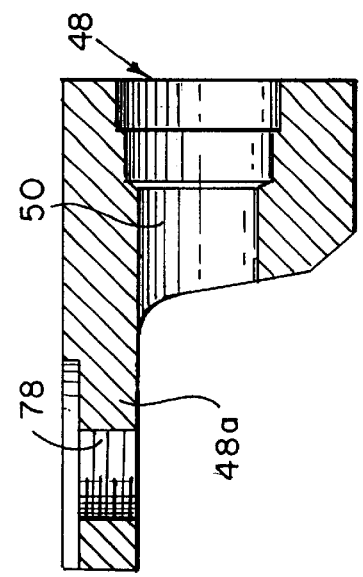
FIG. 16 is a sectional view taken along line 16—16 of FIG. 14.
Figure 13:
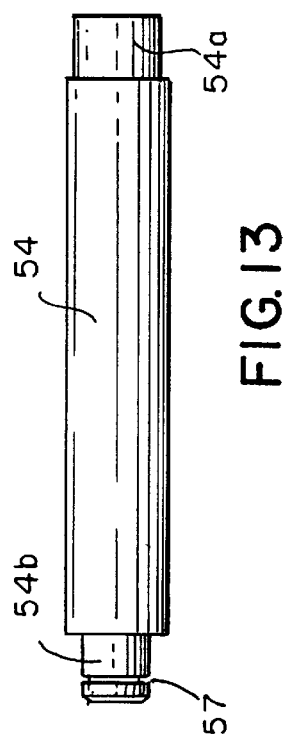
FIGS. 13 and 13A are side elevation and detailed views, respectively, of the fork operating shaft of FIG. 1.
Figure 13A:
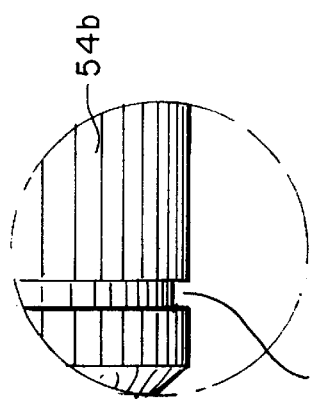
Figure 15:
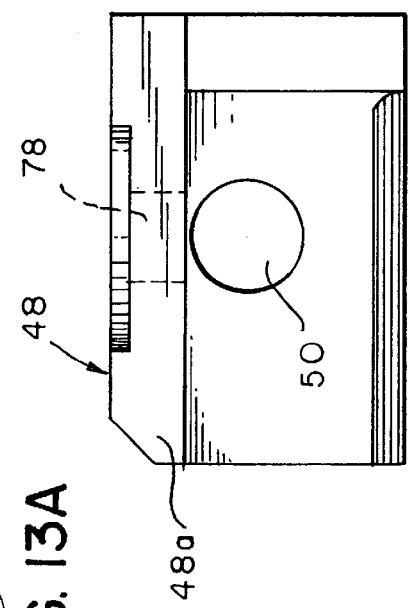

Referring now to FIGS. 6 and 7, the coupling means 34 includes an annular outer member 82 that is keyed against rotation relative to the cover section 4a by the key 84. Concentrically arranged within the outer coupling member 82 is a resilient annular inner member 86 that is radially slit to define a slit 88, as shown in FIG. 6A. As described in the aforementioned Kerr U.S. Pat. Nos. 4,341,294 and 5,638,931, oneway ramp means 85 are provided between the adjacent surfaces of the concentrically spaced coupling members in which are arranged cylindrical roller members 90. The resilient radially-slit annular inner member 86 is normally resiliently biased radially inwardly toward frictional engagement with the outer surface of the hub portion 18a of the associated side gear 18. When the end of the trigger member 36 is inserted into the radial groove or key way 92 (FIG. 6A) formed between the opposing faces of the outer and inner coupling members, the resilient inner coupling member 86 is prevented from angular displacement relative to the outer coupling member 82, the rollers are loose in their respective ramps 85, and the hub portion 18a of side gear 18 rotates freely within the inner coupling member. When the operating pin 36 is removed from the key way 92, the inner coupling member 86 is slightly angularly displaced relative to the outer coupling member owing to the slight frictional engagement between the inner coupling member and the side gear hub portion 18a. The rollers 90 ride up their associated ramps 85 to compress the split inner coupling member radially inwardly into tight non-slipping engagement with the hub portion 18a as shown in FIG. 7A, thereby to lock side gear 18 and the associated axle 26 with the housing 4.

It should be mentioned here that owing to the cooperation between tab portion 38a of trigger ring 38 and the walls of radial slot 40 contained in the housing end section 4a, the trigger pin 36 is always maintained directly opposite the key way 92.

Operation

In operation, assume that the differential is in its normal operating condition shown in FIG. 1, wherein the output axles 24 and 26 are driven at the same rotational velocity by the drive shaft 13 of the vehicle via drive pinion 12, ring gear 14, carrier 4, the pairs of helical gears 20 and 22, and the side gears 16 and 18 that are splined to shafts 24 and 26, respectively. Solenoid 58 is de-energized, and operating shaft 54, fork 60, trigger ring 38, and operating pin 36 are displaced to the left toward the illustrated position. Since operating pin 36 is in the inserted position FIG. 6A, the inner coupling member 86 is in its disengaged condition relative to the hub portion 18a of the side gear 18. The differential thus is free for operation in its normal torque proportioning mode. Indicating light 78 is in its de-energized dark mode.

Assume now that it is desired to fully lock the side gear 18 (and consequently output axle 26) to the carrier 4. The operator manually closes switch 68 to energize solenoid 58, thereby to displace the ferromagnetic operating shaft 54 to the right against the biasing force of spring 59. Fork 60 and trigger ring 38 are similarly shifted to the right to withdraw operating pin 36 from the chamber 92, whereupon the inner coupling member 86 is angularly displaced relative to the outer coupling member 82, the rollers 90 ride up their ramps 85, and the inner coupling member 86 is compressed radially inwardly toward the locking engaged condition relative to the hub portion 18a of side gear 18, as shown in FIG. 7A. The side gear 18 is thus locked to the housing 4 and will be driven simultaneously therewith by the drive shaft 13 and drive pinion 12. When operating shaft 54 is shifted to the right to fully disengage the operating pin from key way 92, the position sensing switch 76 is operated by fork central portion 60a to close switch contact 76a, thereby to energize and illuminate indicator lamp 78.

In order to resume normal operation, switch 68 is opened, operating shaft 54 is displaced to the left by spring 59, and operating pin 36 enters key way 92 to angularly displace inner coupling member 86 to its unlocked position of FIG. 6A. As operating shaft is displaced to the left, switch 76 is opened to de-energize the indicating lamp 78.

If desired, the solenoid operating switch 68 could be operated automatically, for example, by the automatic switch operating means 92 in response to signals $S_1$ and $S_2$ produced by the velocity sending means associated with the output axles 24 and 26, respectively.

Referring now to FIG. 21, instead of the use of the solenoid means 58 of FIG. 1 for operating the coupler operator pin 136 between its inserted and withdrawn positions, other coupler operating means 158 could be used as well, such as the pneumatic diaphragm-operated control means 158a of FIG. 22, the electric-motor-driven screw operating means 158b of FIG. 23, the piston and cylinder control means 158c of FIG. 24, and the lever and cable operating means 158d of FIG. 25. The coupler operating means 158 could also be automatically operable by velocity responsive signals produced by the output shaft velocity sensors 160 and 162, respectively. In each of these coupler operating means, an operator 154 extends through seal means 153 contained in a corresponding opening contained in housing 108.

Alternate Embodiment

As shown in FIGS. 26 and 27, the coupling means could alternatively be of the type in which the outer coupling member 182 is radially slit by the slit 188, and the inner coupling member 186 is solid and is keyed by key 184 to the outer surface of the hub portion 118a of the associated side gear 118. In this embodiment, the resilient outer coupling member 182 is inherently biased radially outwardly biased toward a normally-engaged condition relative to the cover section 104a, and the operating pin is biased toward engagement with the key way 192. In this embodiment, in order to lock the side gear 118 to the carrier 104, the operating pin 136 is axially withdrawn from key way 192 by the operating means against the force of the biasing spring. The outer coupling member 182 is angularly displaced relative to the inner coupling member 186, whereupon the rollers 190 ride on their associated ramps to radially expand the slit outer coupling member into frictional locking engagement with the housing 104.

While in accordance with the provisions of the Patent Statutes the preferred forms and embodiment of the invention have been illustrated and described, it will be apparent to those skilled in the art that various changes may be made without deviating from the inventive concepts set forth above.

What is claimed is:

1. A torque-proportioning fully-locking differential, comprising:
   (a) a stationary hollow differential housing;
   (b) a cylindrical carrier rotatably mounted within said housing for rotation about a given axis, said carrier having end portions containing aligned first bores collinear with said given axis;
   (c) a pair of annular side gears rotatably mounted within said bores, respectively, said side gears being adapted for splined connection with the ends of a pair of aligned output shafts that extend through corresponding openings contained in said housing, respectively;
   (d) pairs of helical pinion gears rotatably mounted within corresponding second bores contained in said carrier for transmitting torque from said carrier to said side gears, respectively;
   (e) coupling means operable between disengaged and engaged conditions to lock a first one of said side gears to said carrier; and
   (f) operating means arranged externally of said housing for operating said coupling means between said disengaged and engaged conditions, respectively.

2. A torque-proportioning fully-locking differential as defined in claim 1, wherein said one side gear has an axially extending annular hub portion, said hub portion having an outer cylindrical surface that cooperates with the wall surface of the associated carrier first bore to define an annular space; and further wherein said coupling means is annular and is arranged concentrically within said annular space between said hub portion outer surface and said carrier first bore wall surface.

3. A torque-proportioning fully-locking differential is defined in claim 2, wherein said coupling means comprises a pair of concentrically spaced annular coupling members, and ramp means arranged between said annular coupling members, one of said coupling members containing a radial slit, said one coupling member being resilient and radially expansible between engaged and disengaged conditions relative to the adjacent one of said side gear hub portion and carrier bore wall surfaces, said coupling members being relatively angularly displaceable between engaged and disengaged conditions in which said hub portion is locked to and released from said carrier, respectively; and further wherein said operating means includes an operating pin moveable between first and second positions relative to said slit to operate said resilient slit coupling member between its disengaged and engaged conditions, respectively.

4. A torque-proportioning fully-locking differential as defined in claim 3, wherein said operating pin is linearly displaceable between said first and second positions in a direction parallel with said carrier axis of rotation.

5. A torque-proportioning fully-locking differential as defined in claim 4, and further including spring means biasing said operating pin toward said first position, whereby said coupling means is normally in its disengaged condition.

6. A torque-proportioning fully-locking differential as defined in claim 5, wherein said operating means further includes:

(a) an annular trigger ring mounted concentrically for axial sliding displacement relative to said carrier, said operating pin being carried by said trigger ring for axial displacement relative to said coupling means between said first and second positions;

(b) a shifting member mounted for linear displacement in an opening contained in said housing, said shifting member having an end portion adjacent said trigger ring; and (c) means rotatably connecting said shifting member with said trigger ring.

7. A torque-proportioning differential as defined in claim 6, and further including seal means for sealing said housing opening in which said shifting member is mounted.

8. A torque-proportioning differential as defined in claim 7, and further including operating means for linearly displacing said shifting member to shift said operating member between said first and second positions.

9. A torque-proportioning differential as defined in claim 8, wherein said operating means comprises an electrical solenoid.

10. A torque-proportion differential as defined in claim 8, wherein said operating means comprises electric-motor-operated screw means.

11. A torque-proportioning differential as defined in claim 8, wherein said operating means comprises pneumatically-operated motor means.

12. A torque-proportioning differential as defined in claim 8, wherein said operating means comprises hydraulically-operated motor means.

13. A torque-proportioning differential as defined in claim 8, wherein said operating means comprises a manually operable cable.

14. A torque-proportioning differential as defined in claim 8, wherein said operating means comprises automatically-operable means responsive to the instantaneous velocity of the output shafts.

15. A torque-proportioning differential as defined in claim 8, wherein said one coupling member is the inner coupling member, and further wherein said trigger ring is keyed against rotary displacement relative to said carrier, thereby to maintain said operating pin opposite said slit.

16. A torque-proportioning differential as defined in claim 15, wherein said operating pin and said trigger ring is spring-biased toward said coupling means.

17. A torque-proportioning differential as defined in claim 8, wherein said one coupling member is the outer coupling member.

18. A torque-proportioning differential as defined in claim 8, wherein said operating means comprises automatically-operable means responsive to the relative torque values of the output shafts.

* * * * *